Oct. 11, 1927.

A. MOORHOUSE

MOTOR VEHICLE

Filed Oct. 26, 1925

1,645,343

Inventor
Alfred Moorhouse
By Millon Tibbitts
Attorney

Patented Oct. 11, 1927.

1,645,343

UNITED STATES PATENT OFFICE.

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed October 26, 1925. Serial No. 64,709.

This invention relates to motor vehicles and more particularly to the propeller shafts thereof. It has for one of its objects to provide a device by which such shafts may be placed in dynamic balance without cutting, drilling or otherwise disfiguring and weakening the shaft.

Another object of the invention is to provide balancing members for shafts in which the weight distribution, and accordingly the balancing effect, may be adjusted over a considerable range without changing the shape or physical condition of either the members or the shaft.

Another object of the invention is to provide means for attaching such balancing members to shafts without riveting or welding, so that the said members may be quickly and easily attached thereto.

Other objects of the invention will appear from the following description taken in connection with the drawing, which forms a part of this specification and in which.

Figure 1:
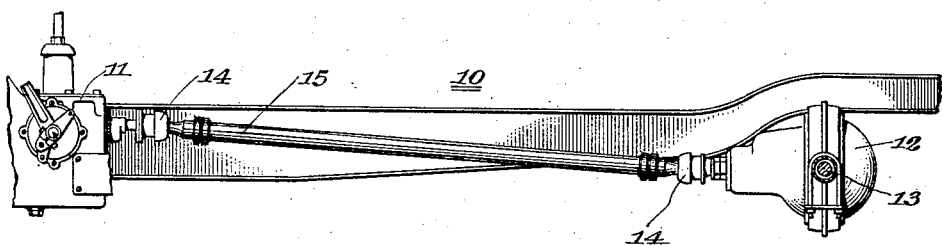
Fig. 1 is a view in side elevation, partially broken away, of part of a motor vehicle chassis showing the application of the invention.
Figure 2:
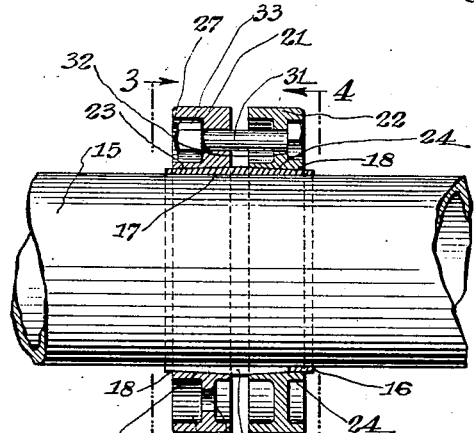
Fig. 2 is a view, partially in elevation and partially in longitudinal section through a portion of the propeller shaft of a motor vehicle, substantially on the lines 2—2 of Figs. 3 and 4.
Figure 3:
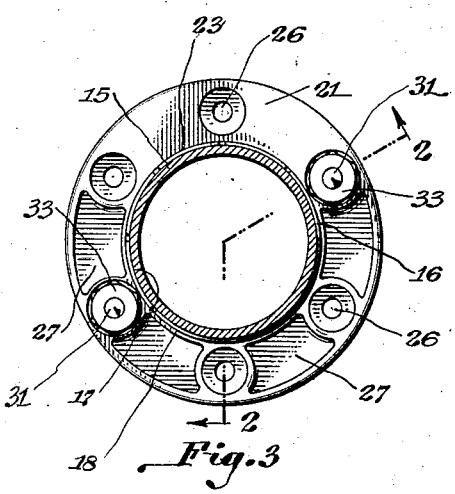
Figure 4:
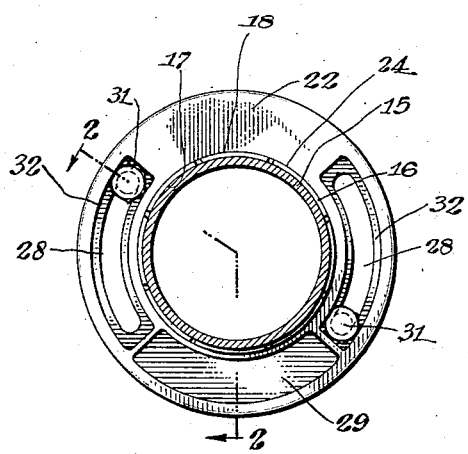
Figure 5:
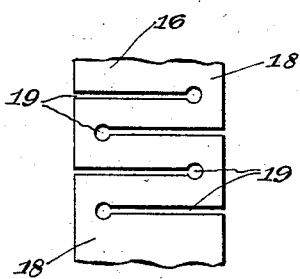

Figs. 3 and 4 are views, partially in side elevation and partially in section substantially on the lines 3—3 and 4—4 respectively of Fig. 2 and Fig. 5 is a detail view showing the construction of the clamping band used in connection with this invention.

In most modern vehicles, the rear axle is driven from the engine through a clutch, a transmission or change speed gear, and a propeller shaft which is provided at one or both ends with universal joints to permit the necessary relative movement between the frame and the axle caused by spring deflection. Such shafts are usually tubular, the end portions to which the universal joints are attached being welded on, and because of variations in the stock, and manufacturing and other variations, it has been found that these shafts, as finished, are frequently in very poor dynamic balance. As most motor vehicles run the greater portion of the time in "high gear", which is usually a direct drive from the engine crank shaft, it will be appreciated that considerable disturbance may be caused by such lack of balance. This is frequently so severe as to cause a material whipping or lateral deflection of the shaft which is very destructive to the universal joints and to other bearings in the power line. It has been previously proposed to balance shafts of this nature by attaching weights thereto, or by removing metal therefrom, but this involves drilling, riveting or welding operations which frequently weaken and disfigure the shaft.

Referring to the drawing, at 10 is shown a portion of the frame of a motor vehicle chassis having the transmission gear case 11, and a differential and drive gear housing 12 from which the rear axle shafts 13 are driven in the usual manner. Transmission gearing in the casing 11 is driven through a suitable clutch from an engine (not shown) mounted at the front of the frame in the well known manner. Just behind the transmission gear and just ahead of the rear axle are universal joints 14, connected by a propeller shaft 15 to complete the drive from the vehicle engine to the wheels. This shaft 15 is preferably of tubular construction connected at its ends to the co-operating elements of the universal joints 14 in any convenient way, and it is to means for placing this shaft in dynamic balance that the present invention is directed.

It is well known that any rotating body may be completely balanced dynamically by adding or subtracting mass therefrom in two spaced planes, normal to the axis of rotation of the body. Such correction planes may be chosen arbitrarily, but in the present instance they may be conveniently taken near the ends of the shaft 15. Then the mass movement, and the angular position of the center of gravity of the balancing masses to be added in these planes, will depend entirely on the specific unbalance of the particular shaft. The amount and angular relation of the correction weights may be readily determined by trial on a balancing machine of any suitable type, the theory and operation of which is well understod in the art to which this invention relates. The present invention provides means by which the correction weights may be easily and accurately fixed to the shaft in the proper position to secure the proper balancing effect without weakening or disfiguring the shaft in any way.

At 16 is shown a flexible band of thin steel or other suitable material, the inner face 17 of which is adapted to contact the surface of the shaft 15 at the plane of correction. The outer face of the band 16 is provided with oppositely inclined surfaces 18, so that the section of the band forms a double wedge having a common base. The band is preferably slotted laterally as shown at 19, to increase its flexibility, the slots 19 running alternately from opposite sides of the band. Adapted to seat upon the band 16 are a pair of balancing rings 21 and 22, having inclined inner faces 23 and 24 respectively, which are adapted to co-operate with the inclined faces 18 of the flexible band 16. The rim of the ring 21 is provided with a number of spaced holes 26 and a portion of this rim is also cut away between the holes 26 as indicated at 27 so that the weight of the ring is non-uniformly distributed around the periphery thereof. Its center of gravity is accordingly removed from its geometric axis, which axis coincides with the axis of rotation of the shaft 15 when it is in position on the shaft. The holes 26 may be counterbored as indicated at 27', if desired. The ring 22 which is similar in general construction to the ring 21, is formed with a pair of circumferential slots 28, both having substantially the same diameter as the holes 26 and having a circumferential length somewhat greater than the circumferential distance between these said holes. This ring also has a portion of its rim cut away, as illustrated at 29, so that its center of gravity is also displaced from its geometric center in the same manner as that of the ring 21.

The rings 21 and 22 are adapted to be connected axially of the shaft 15 by two or more bolts 31, the heads of which may be disposed in widened portions 32 of the slots 28, and which project therethrough and through holes 26, being provided with nuts 33 which are disposed within the counterbored portions 27' of the holes 26. It will be evident that since the slots 28 are of greater length than the distance between adjacent holes 26, the rings 21 and 22 may, by a proper selection of the holes 26, be connected by the bolts 31 in any desired angular relation. Accordingly, the distribution of mass of the correction weight member composed of the two rings and their connecting bolts may be greatly varied between limits, and therefore the center of gravity of the combined rings, which depends upon this distribution of mass, may be likewise varied through a considerable range.

In the application of the balancing weights to the shaft, it follows, therefore, that the distribution of mass of the balancing device may be adjusted by appropriately varying the angular relation of the ring 21 to the ring 22 to exactly fit the requirements set up in any particular shaft and determined by the balancing machine. By placing the band 16 in position in the desired plane of correction, and holding the rings 21 and 22 loosely thereon, the combined center of gravity of the two rings, at which their mass may be considered as concentrated, may be placed in any desired angular relation, about the axis of the shaft 15. Having thus properly positioned the rings upon the shaft and with respect to each other, it is only necessary by tightening the nuts 33 on the bolts 31 to draw the rings 21 and 22 toward each other upon the inclined faces 18 of the band 16, thus tightly clamping the band to the shaft and rigidly wedging the rings to the band. The correction weights are thus easily adjustable, but are, at the same time, rigidly and for all practical purposes permanently secured to the shaft.

As the rings 21 and 22 may be thus used in conjunction to secure any desired degree of balancing effect within limits, they may be cheaply manufactured in quantities for use in balancing shafts of widely differing degrees of unbalance.

Furthermore it will be evident that the balancing structure described may be easily applied to any shaft within the range of its size without disfiguring either the shaft or the weights and without weakening the shaft in any way.

It will be understood that various forms of the invention other than those described above may be used without departing from the spirit or scope of the invention.

Having thus described the invention what is claimed and desired to be secured by Letters Patent is:

1. A device for balancing shafts comprising a band adapted to embrace the shaft and having oppositely inclined outer faces, a pair of rings of non-uniformly distributed mass adapted to seat respectively on said faces, and means to connect the rings in a predetermined phase relation, said means being adapted to clamp the rings against the faces of the band.

2. A device for balancing shafts comprising a band adapted to embrace the shaft and having oppositely inclined outer faces, a pair of rings of non-uniform weight adapted to seat respectively on said faces, bolts adapted to clamp the rings axially on said faces, and means co-operating with the bolts to adjust the angular relation of said rings.

3. A device for balancing shafts comprising a band adapted to embrace the shaft and having oppositely inclined outer faces, a pair of rings having a portion of their peripheries of reduced mass, circumferentially spaced bolt holes in one of said rings, spaced slots in the other ring, and axially disposed bolts clamping said rings through said holes and slots in adjustable angular relation.

4. A balancing device for shafts comprising co-operating members having circumferentially arranged heavy portions, means to connect said members in a predetermined angular relation about the shaft axis, and wedge shaped means to rigidly secure the assembly members to the shaft.

5. The combination with a propeller shaft for motor vehicles of a balancing device comprising associated rings each having a geometric axis coinciding with the axis of the shaft and a center of gravity displaced from said axis, adjustable means to maintain a predetermined angular relation between said rings, and wedge means co-operating with the first named means to rigidly secure the device to the shaft.

6. The combination with a propeller shaft for motor vehicles of a balancing device comprising ring shaped members having metal removed from portions of the rims, means to secure said rings in pairs in a predetermined angular relation, and a flexible band adapted to be clamped to the shaft by said members to secure the assembly to the shaft.

7. The combination with a propeller shaft for motor vehicles of a balancing device comprising ring shaped members having centers of gravity removed from their geometric axes and having beveled inner faces, a flexible band adapted to engage the shaft having oppositely inclined outer faces to co-operate with said beveled faces, a plurality of spaced bolts adapted to draw said members axially of the shaft, and means for changing the mass distribution of the device.

In testimony whereof I affix my signature.

ALFRED MOORHOUSE.